US006435770B1

(12) United States Patent
Shi

(10) Patent No.: US 6,435,770 B1
(45) Date of Patent: Aug. 20, 2002

(54) METHOD OF FORMING A SYNTHETIC CAP ON A BULK MATERIAL PILE

(75) Inventor: Caijun Shi, Burlington (CA)

(73) Assignee: Advanced Material Technologies LLC, Hamburg, NY (US)

( * ) Notice: Subject to any disclaimer, the term of this patent is extended or adjusted under 35 U.S.C. 154(b) by 0 days.

(21) Appl. No.: 09/692,788

(22) Filed: Oct. 20, 2000

(51) Int. Cl.⁷ .................................................. B09B 1/00
(52) U.S. Cl. ............................. 405/129.9; 405/129.95; 405/129.45; 405/129.55; 241/23
(58) Field of Search ........................ 405/129.45, 129.55, 405/129.9, 129.95; 241/23, DIG. 38

(56) References Cited

U.S. PATENT DOCUMENTS

| | | | |
|---|---|---|---|
| 2,802,303 A | | 8/1957 | Weeks |
| 3,466,873 A | | 9/1969 | Present ........................... 61/35 |
| 3,635,409 A | | 1/1972 | Brewer ......................... 241/43 |
| 4,028,130 A | * | 6/1977 | Webster et al. .............. 106/697 |
| 4,076,862 A | * | 2/1978 | Kobeski et al. .............. 106/774 |
| 4,297,810 A | | 11/1981 | Hansford .......................... 47/9 |
| 4,374,672 A | | 2/1983 | Funston et al. ............... 106/97 |
| 4,421,788 A | | 12/1983 | Kramer ....................... 427/136 |
| 4,432,666 A | * | 2/1984 | Frey et al. ................... 106/640 |
| 4,519,338 A | | 5/1985 | Kramer et al. .............. 118/305 |
| 4,790,691 A | | 12/1988 | Freed .......................... 405/263 |
| 4,834,300 A | | 5/1989 | Wojciechowski et al. ..... 241/24 |
| 4,909,667 A | | 3/1990 | DeMello ..................... 405/128 |
| 4,927,317 A | | 5/1990 | Acosta ........................ 414/724 |
| 4,950,426 A | | 8/1990 | Markowitz et al. .......... 252/633 |
| 5,024,770 A | | 6/1991 | Boyd et al. .................. 210/747 |
| 5,026,208 A | | 6/1991 | Beyer et al. ................. 405/129 |
| 5,040,920 A | | 8/1991 | Forrester .................... 405/129 |
| 5,054,962 A | | 10/1991 | Bahnmüller et al. ......... 405/129 |
| 5,082,500 A | * | 1/1992 | Nachtman et al. ........ 106/162.5 |
| 5,161,915 A | | 11/1992 | Hansen ....................... 405/129 |
| 5,320,450 A | * | 6/1994 | Smith .................. 241/DIG. 38 |
| 5,516,830 A | | 5/1996 | Nachtman et al. ........... 524/446 |
| 5,525,009 A | | 6/1996 | Hansen ....................... 405/129 |
| 5,556,033 A | * | 9/1996 | Nachtman .................... 239/10 |
| 5,855,664 A | * | 1/1999 | Bielecki et al. ........... 106/18.11 |
| 6,096,373 A | * | 8/2000 | Nachtman et al. ........ 106/162.5 |

OTHER PUBLICATIONS

C&D Debris Recycling Study: Final Report, cover, cover and "gypsum Drywall" section, from www.dep.state.fl.us/waste/categories/recy/published @ 2000.*
Gypsum Wallboard Recycling and Reuse Opportunities in the State of Vermont, Aug. 4, 2000; cover, contents, pp. 15 and 20.*
Construction and Demolition Abstracts : from rnet.nrcan.gc.ca/consab–e.htm; from Oct. 1999, Jun. 1999, Aug. 1998, Apr. 1998, Jan. 1998, May 1997, Feb. 1997, Nov. 1996, Sep. 1996, and Jul. 1995 issues.*
"Alternate Daily Cover" brochure from Southwest Environment Services, Inc., www.southwestenvironment.com/cover.html website, which discloses a 2 bag system of forming landfill daily covers from Enviro–set®, which is essentially pure gypsum, an Enviro–Gro®.*
Balazik, Ronald R., "Gypsum", *Minerals Yearbook*, pp 27–43, 1998.
American Coal Ash Association, "1999 Coal Combustion Product Production and Use".
California Integrated Waste Management Board, "Drywall Recycling", 2000.

* cited by examiner

*Primary Examiner*—Heather Shackelford
*Assistant Examiner*—Katherine Mitchell
(74) *Attorney, Agent, or Firm*—Hodgson Russ LLP

(57) ABSTRACT

A synthetic cover for bulk material piles and loads in transit may be formed from a slurry mixture of liquid and powder made from recycled gypsum wallboard. These constituents may be mixed and applied to cover a bulk material pile and/or waste pile, and/or to control erosion. The cover will harden to minimize water infiltration, wind blown dust, odor and affinity to birds, flies and other insects. The liquid may include water, landfill leachate and wastewater; the powder from heated recycled gypsum wallboard may include alpha-hemihydrate and shredded paper, beta-hemihydrate and shredded paper or anhydrate and shredded paper. When clean water is used, the cover is non-toxic, non-combustible and harmless to fish, birds, plants and animals.

12 Claims, No Drawings

METHOD OF FORMING A SYNTHETIC CAP ON A BULK MATERIAL PILE

FIELD OF THE INVENTION

This invention relates to compositions producing a synthetic cap for bulk material piles, including waste and soil, including soil erosion control, using a powder derived from recycled gypsum wallboard and a process to make the powder. Constituents for the cap include liquid and powder. These constituents are mixed to form a slurry, which is distributed over a material pile. The cover will harden to minimize water infiltration, nuisance fugitive dust, odor, and affinity to birds, flies and other insects. Inert fillers and fiber can be added to the slurry mixtures.

BACKGROUND OF THE INVENTION

Gypsum wallboard is made of a sheet of gypsum, which is covered on both sides with paper facing and paperboard backing. The wallboard is composed of approximately 93% gypsum and 7% paper, by weight. More than four million tons of gypsum waste is generated every year by wallboard manufacturing and installation and building demolition. Only a small portion of the scrap is being recycled for agricultural purpose or new wallboard; most is sent to landfills. It is very difficult to separate the paper from gypsum to recycle wallboards. Current technology produces recycled gypsum that contains about 1.75% paper, a concentration which is too great and limits the amount of recycled gypsum allowable in new drywall, since the paper content affects the product's fire rating. However, the paper content can remain for some uses such as soil stabilization.

During shipping, processing, or storage, bulk materials may concentrate in a particular area or site. Bulk materials concentrated into piles must be covered to minimize or prevent blowing dust; water damage; odor; prevent fires; or movement or erosion of material; or prevent vectors such as birds, flies, and/or other insects from feeding thereon. Typically bulk materials are covered by spreading a synthetic material such as a tarp or foam over exposed portions of the pile. For example, in power plants, piles of coal may be covered by spreading an elastomeric geomembrane thereon; the thickness and construction of the membrane depends on the length of time the pile is to remain covered and the expected climatic conditions.

United States Gypsum Company has been marketing a product called Airtrol Plaster®, which is mixed with cellulose fiber mulch and water to form a slurry and is sprayed for a landfill cover or erosion control. Airtrol Plaster® is made from industrial grade gypsum and must be mixed with cellulose fiber mulch to form a cover.

Kramer et al, describes a hardenable plastic foam cover which is formed by spraying over waste materials. Similarly, companies such as 3M Environmental Protection Products of St. Paul, Minn., Chubb Environmental Security of Exton, Pa., and Russmer of Westchester, Pa., all have developed synthetic foams which can be sprayed to function as a daily cover. The foam spray solution is expensive, typically 12 to 15 cents per square foot, substantially more expensive than soil.

Another disadvantage of the daily foam cover substitutes is that they cannot be easily formulated from recycled materials. The increasing sensitivity towards the environment by the general population has greatly increased the demand for recycled products. State and municipal environmental officials, who operate or regulate most landfills, have been especially active in encouraging use of recycled products. Among the advantages of recycling is the fact that the waste material is converted into useful products rather than taking up rapidly vanishing landfill space. Hence, such officials are making great efforts to integrate recycled materials into operations under their control, including landfill operations.

Another alternative to using earthen material as a daily cover is disclosed in U.S. Pat. Nos. 4,909,667 to DeMello and 4,927,317 to Acosta. DeMello and Acosta disclose a geotextile or sheet-like member, such as canvas and the like, which is laid over the working face of a landfill at the end of the operating day. A key disadvantage of geotextile covers is their expense which may be as high as $2.25 per square yard. In addition, geotextiles are subject to mechanical damage, such as tears, punctures, requiring replacement or repair. Moreover, these covers are difficult to apply in inclement weather.

A daily cover system and method for production of a cover system has been disclosed in U.S. Pat. No. 5,161,915 issued Nov. 10, 1992, and US Pat. No. 5,525,009 issued Jun. 11, 1996 to Hansen. The cover disclosed system primarily uses cement kiln dust or Portland cement and flyash, or Portland cement crushed stone dust as a binder, and is limited since the ingredients may be costly, inefficient, and perhaps may even be an environmental hazard, and therefore defeating the aim of the invention, i.e. to cover waste piles and prevent them from being hazard. The disclosed ingredients can be highly caustic and a potential environmental hazard.

Cement kiln dust is not widely available. In August 1999, the U.S. Environmental Protection Agency (USEPA) proposed new regulations for management of cement kiln dust, which was designated as "high-volume, low toxicity" special wastes requiring individualized treatment under the Resource Conservation and Recovery Act (RCRA). Although the proposed rule does not limit the beneficial use of cement kiln dust in a commercial landfill, the handling and transportation regulations could potentially pose difficulties for customers and haulers. In most cases when cement kiln dust is used as a binder, it may take a long time for the slurry to harden. If a mixture of Portland cement and flyash, or a mixture of Portland cement and aggregate dust is used for binding, the result may be expensive. A binder using a small concentration of Portland cement is slow to harden.

SUMMARY OF THE INVENTION

In view of the above stated difficulties for using recycled gypsum wallboard and limitations and shortcomings of sprayable covers there still exists a need in the art to develop new better performing applications for recycled gypsum wallboard and an alternative to sprayable cover which uses inexpensive, widely available, and environmentally friendly recycled materials.

More specifically, it is a purpose of this invention to provide a method of processing recycled gypsum wallboard and applications for processed recycled gypsum wallboard.

More specifically, it is a purpose of this invention to provide a method of manufacturing for sprayable cover which uses widely available recycled materials or by-products as a binder.

A further objective of this invention is to be able to provide a sprayable cover that has minimal environmental hazards.

A further objective of this invention is to be able to provide a sprayable cover that can form and harden within a short period of time.

The aforementioned objectives are achieved by a sprayable cover in accords with the present invention.

This invention provides a method for converting recycled gypsum wallboard to a useful powder and compositions for a sprayable mixture, which consists of the powder made from recycled gypsum wallboard, inert filler, and liquid.

Recycled gypsum wallboard can be very large in size. Large gypsum wallboard, including the paper facing, should be crushed into small pieces then pulverized into a powder with 90% particles passing a No. 30 sieve. The powder virtually consists of approximately 93% gypsum and 7% cellulose fiber. Depending on the end application, a portion of paper facing can be easily screened out during the crushing and pulverizing processes.

The powder is then heated to form a hemi-hydrate or anhydrate to obtain cementitious properties. Pulverized recycled gypsum is heated between 120° C. to 300° C. to obtain a hemi-hydrate, and is heated over 300° C. to obtain anhydrate. Alpha-hemyhydrate is formed when gypsum is heated in an autoclave between 120 to 200° C., and beta-hemihydrate is generated when gypsum is heated in a dry furnace between 1200C to 3000C. Alpha-hemihydrate and beta-hemihydrate have different morphologies and alpha-hemihydrate has lower water requirements than beta-hemihydrate, causing difference in strength of hardened gypsum products.

The cellulose fiber starts charring when it is heated in excess of 250° C. All cellulose fiber will be destroyed when heated over 300° C. For cover applications, it is preferably that the powder is heated below 250° C. so the fiber remains and energy consumption is minimized.

The invention also incorporates a composition for a cover or bulk piles and control or prevention of soil erosion. The cover may contain approximately 30 to 70% liquid, approximately 5 to 60% heated powder, up to 60% inert filler, up to 3% retarder when the powder is hemihydrate, and up to 15% fiber.

The liquid can include water, landfill leachate, and/or industrial wastewater. The powder can be alpha-hemihydrate, beta-hemihydrate or anhydrate depending on preparation. The hydration process for alpha-hemihydrate and beta-hemihydrate are the same. A retarder is a material which will lengthen the setting time of the gypsum plaster. This may include sodium citrate. In the presence of water, hemihydrate and anhydrate react as follows:

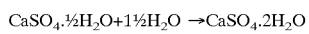

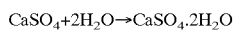

Inert fillers may include coal flyash, fine sand, ground silica, clay or crushed stone dust. Based on ASTM Specification C618, coal flyash is classified into either Class C or Class F. Flyash belongs to Class F if its ($SiO_2+Al_2O_3+Fe_2O_3$) concentration is greater than 70%, and belongs to Class C if its ($SiO_2+Al_2O_3+Fe_2O_3$) concentration is at least 50% and less than 70%. Usually, Class F flyash has a low concentration of CaO and exhibit pozzolanic properties, but Class C flyashes contain up to 20% CaO and exhibit cementitious properties, and thus can be directly used as a binder. Type F flyash is a pozzolanic material and possesses little or no cementitious value. In the presence of moisture, it will chemically react with calcium hydroxide at ordinary temperature to form compounds possessing cementitious properties. In this invention, it is a type F flyash with a high carbon content which is preferred.

The fibers may include cellulose such as shredded paper, finely shredded wood fibers, chopped straw, or hay. The fibers may also include plastic fibers such as polyethylene terephthalate.

DETAILED DESCRIPTION OF THE PREFERRED EMBODIMENTS

Typically gypsum wallboard has a size of 4'×8' and can vary up to three quarters of an inch in thickness. Recycled gypsum wallboard can be or may approach this size. Large gypsum wallboard, together including the paper facing, should immediately be crushed into pieces less than ten inches, then pulverized into a powder containing particles with 90% passing through a 30 mesh screen. Different mechanical devices can be used to crush gypsum wallboard. It was found that the Grizzly Lump Breaker is exceptional for crushing gypsum wallboard. The feed opening in the crusher can be sized up to four feet in width to accommodate all sizes of gypsum wallboard. Gypsum wallboard on a weight basis, consists of approximately 93% gypsum and 7% paper. Depending on the application, if less paper is desired, a screen may be installed at the discharge opening of the crusher to screen out a portion of the paper during the crushing process.

Crushed gypsum wallboard pieces can now be pulverized into powder. Since gypsum is very soft, a hammer mill can easily pulverize gypsum wallboard pieces into powder. The powder is actually a mixture of small paper fiber and gypsum particles. It is desirable that 90% particles of the powder pass a No. 30 mesh sieve. A screen may also installed in the hammer mill so some paper can be screened out if the paper content is too high.

In order for the powder to obtain cementitious properties it is then heated to convert gypsum laden powder into a hemihydrate or anhydrate. When gypsum is heated between 120° C. to 300° C., a hemi-hydrate is obtained; if heated above 300° C., an anhydrate is obtained. The dehydration process can be shown as follows:

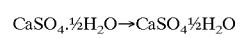

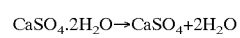

The heating process can be carried out in a commercially available aggregate dryer or rotary or shaft kiln. The heating temperature in an aggregate dryer is usually moderate and can only produce hemihydrate. Production of anhydrate requires a higher temperature and can be obtained by using a rotary kiln.

If gypsum powder is heated in an aqueous environment, alpha-hemyhydrate is obtained. Depending on the properties of gypsum powder and catalyst used, it requires a temperature of 80 to 300° C. to convert gypsum to alpha-hemihydrate. Alpha-hemihydrate and beta-hemihydrate have the same chemical composition but different morphologies which require different water requirements. Alpha-hemihydrate has a lower water requirement and higher strength than a beta-hemihydrate.

The paper fiber starts to char when heated over 250° C. in a furnace. All paper fiber will be completely burnt when heated above 300° C. For cover applications, it is preferred that the powder is heated at temperatures below 250° C. to ensure that paper fiber remains and energy consumption required for heating is minimized.

The invention also incorporates a composition of a cover for bulk material piles and soil erosion control, comprising approximately 30 to 70% liquid, about 5 to 60% percent powder derived from recycled gypsum wallboard, up to 60% inert filler, up to 3% retarder when the powder is hemihydrate, and up to 15% of additional fiber. These constituents may be mixed and form a slurry, which is sprayed to form an effective cover layer over soil, refuse at a dump site, or grains in a stockpile. Typically, the slurry will form and harden within several hours.

The liquid may comprise water, landfill leachate, and/or industrial wastewater. The powder can be alpha-hemihydrate, beta-hemi-hydrate or anhydrate depending on heating conditions. The hydration processes of alpha-hemihydrate and beta-hemihydrate are the same. In the presence of water, either form of hemihydrate and anhydrate hydrate as follows:

$$CaSO_4 \cdot \tfrac{1}{2}H_2O + 1\tfrac{1}{2}H_2O \rightarrow CaSO_4 \cdot 2H_2O$$

$$CaSO_4 + 2H_2O \rightarrow CaSO_4 \cdot 2H_2O$$

The materials which may be used as inert fillers include coal flyash, pulverized silica, or ceramics, shredded paper, pulverized waste glasses, crushed stone dust, or shredded construction and/or demolition debris. Based on ASTM Specification C618, coal flyash is classified into Class C and Class F. Flyash belongs to Class F if its ($SiO_2+Al_2O_3+Fe_2O_3$) concentration is greater than 70%, and belongs to Class C if its ($SiO_2+Al_2O_3+Fe_2O_3$) concentration is at least 50% and less than 70%. Usually, Class F flyashes have a low concentration of CaO and exhibit pozzolanic properties, but Class C flyashes contain up to 20% CaO and exhibit cementitious properties. Type C flyash has cementitious properties and can be directly used as a binder. Type F flyash exhibit pozzolanic properties and contain little or no cementitious value. In the presence of moisture, Type F will chemically react with calcium hydroxides at ordinary temperatures to form compounds possessing cementitious properties. In this invention, it is preferred to use a type F flyash containing a high carbon content.

Construction and demolition debris comprises waste materials associated with the razing of buildings, roads, bridges, and other structures and/or debris associated with the construction or renovation of buildings. It typically includes, but is not limited to, ferrous and non-ferrous metals, concrete, bricks, lumber, plaster and plasterboard, insulation material, shingles and roofing material, floor, wall and ceiling tile, asphalt, glass, pipes and wires, carpet, wallpaper, felt and other items physically attached to the structure, including compacted appliances, structural fabrics, paper or cardboard packaging. Typically excluded from construction and demolition debris are materials that pose an undue risk to public health or the environment such as industrial waste or by-products, paint, tar, solvents, creosote, adhesives and the like. Construction debris should be shredded into size smaller than one-eighth of an inch.

The component used in the liquid portion of the mixture may include water, landfill leachate, and/or industrial wastewater. Although any of these liquids will suffice, water is preferred since it is readily available. Water quality may vary including turbid, polluted, and/or non-potable water. Industrial wastewater may also be used. These may be effective as a liquid constituent provided that they do not contain materials which react with other constituents during mixing. Landfill leachate, created by percolation of water through buried refuse at a landfill, can also be used. Disposal and treatment of landfill leachate are troublesome and expensive, the use of landfill leachate may provide an effective method of its disposal. It should be noted that use of landfill leachate and industrial wastewater as the liquid component may require increased safety precautions.

If additional fiber is needed, the fiber of the present invention include shredded paper, wood, textile, chopped straw and hay, glass and plastic fibers. The paper facing on wallboard is crushed and pulverized into very small fibers. If additional fiber is required, preferably, shredded newspaper or shredded mixed waste paper should be used because of its physical properties and commercial availability. Papers can be shredded into particles with mean diameter less than one-half inch. These fibers can include shredded magazines, phone books, corrugated containers, junk mail, office paper, etc. Shredded wood fibers may also be used as a component provided that the wood is finely shredded. The wood fiber must be in a string or hair-like shape such as fine excelsior. Wood chips are not satisfactory for use as a cellulose fiber constituent.

Fibers that including glass, plastic, textile fibers and straw are preferably short in length and narrow in diameter, approximately ⅛ inch in diameter and ¼ inch in length being the maximum size for a sprayable composition.

The synthetic cover in the present invention is formed mixed by filling the mixing tank with a predetermined amount of liquid constituent such as water, landfill leachate, or industrial wastewater. If additional fiber is needed, the proper amount of fiber is then loaded into the mixer. The agitator is activated to mix the cellulose fibers and plastic with the liquid. Typically, it is necessary to run the agitator for approximately a minute or longer to adequately mix the constituents. The heated powder from recycled gypsum wallboard and inert fillers is then placed in the mixer where it is thoroughly mechanically mixed with the liquid, cellulose and plastic fibers. The mixing time may vary depending upon the percentage of each constituent. However, the materials should be mixed until the mixture has a thick, viscous "milk shake" consistency.

After the mixture is properly agitated, it is uniformly sprayed onto the bulk pile surface using any conventional hydroseeding machine. The thickness of the sprayed layer varies from one-eighth to one-quarter of an inch. After the entire surface area has been sprayed, the slurry will adhere to the bulk pile or soil and cohere to itself, and will harden within hours. Since the setting time is short, the pile should be sprayed very quickly and the applicator and mixing unit must be cleaned immediately thereafter. Typically, water will suffice to clean the apparatus.

The pH of recycled gypsum wallboard cover is normally in the range of 6 to 9, when using clean water. The cover is non-toxic, non-combustible, and harmless to fish, birds, plants and animals.

EXAMPLE 1

Some drywall scraps were pulverized using a hammer mill and the paper facing was separated during grinding. The pulverized drywall was heated at 450° F. (232° C.) for 2 hours. Gypsum in the drywall is converted to beta-hemihydrate by heating. A cover composition was designed utilizing constituents and parameters shown in Table 1. These constituents were mixed as previously discussed. The mixture was then applied as a cover on a tray of soil. The mixture had sufficient viscosity which properly adhered to the soil and hardened within two hours.

A test using a mixture of 90% a Portland cement and 10% flyash as binder and shredded papers as fiber. During the mixing and application, the hemihydrate based cover exhibited significantly better plasticity and adherence to soil than a mixture composed of Portland cement and flyash. It took more than 10 hours for the Portland cement and flyash cover to harden. Also, the cover made from heated recycled gypsum wallboard powder depicted a smoother appearance more than the mixture of Portland cement and flyash cover.

TABLE 1

| | Constituent Type | Weight (kg) | Mixture Percentage (Wt %) |
|---|---|---|---|
| Liquid | Water | 2.7 | 47.3 |
| Binder | Beta-Hemihydrate (Pulverized drywall without paper heated at 450 F.) | 3.0 | 52.6 |
| Retarder | Sodium Citrate | 0.005 | 0.1 |

EXAMPLE 2

In another experiment, drywall scraps without paper facing were pulverized and heated at 450° F., and then mixed with shredded paper and water. The mixing proportion is summarized in Table 2. The mixing and application processes were the same as described as in Example 1 above. The sprayed cover hardened within one hour and exhibited a very smooth appearance.

The cover over the tray of soil was placed in the ambient outdoor environment and exposed to sunlight and rain during the month of June for a period of more than four weeks and has undergone more than 20 cycles of wet and dry weather yet remains in excellent condition with minimal shrinkage and no cracking.

TABLE 2

| | Constituent Type | Weight (kg) | Mixture Percentage (Wt %) |
|---|---|---|---|
| Liquid | Water | 4.0 | 60.6 |
| Binder | Beta-Hemihydrate (Pulverized drywall without paper heated at 450 F.) | 2.5 | 37.8 |
| Fiber | Shredded Mixed papers | 0.1 | 1.6 |

EXAMPLE 3

In another experiment, drywall scraps with paper facing were pulverized and heated at 450° F., and then mixed with water. The mixing proportion is summarized in Table 3. The mixing and application processes were the same as described as above in Example 1. The sprayed cover hardened within one hour and exhibited a very smooth appearance.

TABLE 3

| | Constituent Type | Weight (kg) | Mixture Percentage (Wt %) |
|---|---|---|---|
| Liquid | Water | 4.0 | 67.8 |
| Binder | Pulverized drywall with paper heated at 450 F. | 1.9 | 32.2 |

EXAMPLE 4

In another test, drywall with paper facing was pulverized and heated at 450° F., and then mixed with crushed waste glass and water. The mixing proportion is summarized in Table 4. The mixing and application processes were the same as described as above. The sprayed cover hardened within 45 minutes and exhibited a very smooth appearance.

TABLE 4

| | Constituent Type | Weight (kg) | Mixture Percentage (Wt %) |
|---|---|---|---|
| Liquid | Water | 4.0 | 61.5 |
| Binder | Pulverized drywall with paper heated at 450° F. | 1.5 | 23.0 |
| Filler | Pulverized mixed waste glasses | 1 | 15.5 |

EXAMPLE 5

In another test, drywall with paper facing was pulverized and heated at 450° F., and then mixed with ASTM Type F coal flyash and water. The mixing proportion is summarized in Table 5. The mixing and application processes were the same as described as above. The sprayed cover hardened within 30 minutes and exhibited a very smooth appearance.

TABLE 5

| | Constituent Type | Weight (kg) | Mixture Percentage (Wt %) |
|---|---|---|---|
| Liquid | Water | 2.7 | 35.1 |
| Binder | Pulverized drywall with paper heated at 450° F. | 0.5 | 6.5 |
| Filler | Type F coal flyash | 4.5 | 58.4 |

EXAMPLE 6

In another test, drywall with paper facing was pulverized and heated at 450° F., and then mixed with crushed stone dust and water. The mixing proportion is summarized in Table 6. The mixing and application processes were the same as described as above. The sprayed cover hardened within 35 minutes and exhibited a very smooth appearance.

TABLE 6

| | Constituent Type | Weight (kg) | Mixture Percentage (Wt %) |
|---|---|---|---|
| Liquid | Water | 4.5 | 46.9 |
| Binder | Pulverized drywall with paper heated at 450° F. | 4.5 | 46.9 |
| Filler | Crushed stone dust | 0.5 | 5.2 |
| Fiber | Shredded paper | 0.1 | 1.0 |
| Retarder | Sodium Citrate | 0.0005 | 0.005 |

The forgoing has described the invention and certain embodiments thereof. It is to be understood that the invention is not necessarily limited to the precise embodiments described therein but variously practiced with the scope of the following claims.

I claim:

1. A bulk material cover, which comprises:
   (a) about 30 to about 70 weight percent liquid;
   (b) about 5 to about 60 weight percent processed gypsum wallboard powder comprising paper fibers at least partially bonded to gypsum;
   (c) up to about 60 weight percent inert filler; and
   (d) up to about 20 weight percent fiber, wherein the indicated weight percents are based on total weight of the material.

2. The cover according to claim 1, wherein the liquid is selected from the group consisting of landfill leachate, water and wastewater.

3. The cover according to claim 1, wherein the processed powder includes paper fibers and at least one of the group consisting of alpha-hemihydrate gypsum, beta-hemihydrate gypsum and anhydrate.

4. The cover according to claim 1 wherein the inert filler is selected from the group consisting of coal fly ash, ground recycled glass, shredded construction debris, demolition debris, sand, crushed stone dust, and mixture thereof.

5. The cover according to claim 1, wherein the fiber is selected from the group consisting of shredded paper, shredded wood, polyethylene terephthalate, chopped straw, hay, and mixtures thereof.

6. The cover of claim 1 containing up to about 3% weight percent retarder.

7. The cover according to claim 6, wherein the retarder includes sodium citrate.

8. The cover of claim 1 wherein the pulverized powder comprises particles with 90% passing a no. 30 sieve.

9. The cover of claim 1 wherein the powder is characterized as having been heated between about 120° C. to about 300° C. to form the beta-hemihydrate.

10. The cover of claim 1 wherein the powder is characterized as having been heated in excess of about 300° C. to form the anhydrate.

11. The cover of claim 1 wherein the powder is characterized as having been heated under hydrothermal conditions to obtain alpha-hemihydrate.

12. The cover of claim 11 wherein the hydrothermally treated powder is characterized as having been dried prior to incorporation into the cover.

* * * * *

UNITED STATES PATENT AND TRADEMARK OFFICE
CERTIFICATE OF CORRECTION

PATENT NO. : 6,435,770 B1
DATED : August 20, 2002
INVENTOR(S) : Shi

It is certified that error appears in the above-identified patent and that said Letters Patent is hereby corrected as shown below:

<u>Title page,</u>
Item [73], Assignee, "Material" should be -- Materials --

Signed and Sealed this

Tenth Day of June, 2003

JAMES E. ROGAN
*Director of the United States Patent and Trademark Office*